United States Patent [19]
Holmes

[11] Patent Number: 4,801,938
[45] Date of Patent: Jan. 31, 1989

[54] REMOTE OUTPUT INDICATOR FOR PROVIDING OUTPUT INDICATIONS FROM A REMOTELY LOCATED RADAR DETECTOR WHICH IS ADAPTED TO BE USED IN CONNECTION WITH A BRAKE LIGHT INDICATOR

[76] Inventor: Steven C. Holmes, 2925 Charing Cross Rd., Oklahoma City, Okla. 73120

[21] Appl. No.: 28,592

[22] Filed: Mar. 20, 1987

Related U.S. Application Data

[63] Continuation-in-part of Ser. No. 2,424, Jan. 12, 1987.

[51] Int. Cl.$^4$ .............................................. G01S 7/40
[52] U.S. Cl. ..................... 342/20; 342/176; 340/600; 340/904; 455/49; 455/57; 455/227
[58] Field of Search .............. 342/20, 58, 176, 177, 342/; 340/901, 902, 904, 936, 87, 76, 600; 455/39, 49, 57, 66, 227

[56] References Cited

U.S. PATENT DOCUMENTS

| | | | |
|---|---|---|---|
| 3,665,392 | 5/1972 | Annas | 340/67 |
| 3,905,017 | 9/1975 | Samra | 340/95 |
| 4,001,805 | 1/1977 | Golbe | 340/527 |
| 4,081,751 | 3/1978 | Maddaloni | 455/154 |
| 4,181,910 | 1/1980 | Hitterdal | 342/20 |
| 4,189,720 | 2/1980 | Lott | 340/539 |
| 4,190,838 | 2/1980 | Kemp | 342/20 |
| 4,280,223 | 7/1981 | Roettele et al. | 375/93 |
| 4,318,103 | 3/1982 | Roettele et al. | 342/20 |
| 4,373,153 | 2/1983 | Sano et al. | 340/87 |
| 4,417,235 | 11/1983 | Del Grande | 340/531 |
| 4,464,649 | 8/1984 | Her | 340/72 |
| 4,488,141 | 12/1984 | Ohlenforst et al. | 340/97 |
| 4,520,349 | 5/1985 | Varano | 340/531 |
| 4,573,041 | 2/1986 | Kitagawa et al. | 340/538 |
| 4,575,782 | 3/1986 | Levine et al. | 362/61 |
| 4,700,191 | 10/1987 | Manor | 342/20 X |
| 4,719,462 | 1/1988 | Hawkins | 342/20 |

OTHER PUBLICATIONS

Exhibit A-advertisement for Eclipse Products, Inc.
Exhibit B-advertisement for Remote Systems.
Exhibit C-an article entitled "Find the Hidden Radar Detector" by Csaba Csera and Don Sherman, Mar. 1985, Car and Driver.

*Primary Examiner*—Theodore M. Blum
*Assistant Examiner*—Bernarr Gregory
*Attorney, Agent, or Firm*—Dunlap, Codding & Peterson

[57] ABSTRACT

A remote output indicator for use with a radar detector providing a perceivable output indication to detect signals from an operating radar within an automobile having a rear window and a rear deck disposed near the rear window. The remote indicator includes a rear brake light housing and a mounting means for connecting the rear brake light housing to the automobile generally near the rear window. The radar detector is mountable within a housing space within the rear brake light indicator housing. A remote unit is disposed near the rear brake light indicator housing for sensing the radar detector perceivable output indications and providing an output signal in response thereto. A console receives the output signal from the remote unit and provides output indications which are perceivable by the driver of the automobile.

10 Claims, 2 Drawing Sheets

REMOTE OUTPUT INDICATOR FOR PROVIDING OUTPUT INDICATIONS FROM A REMOTELY LOCATED RADAR DETECTOR WHICH IS ADAPTED TO BE USED IN CONNECTION WITH A BRAKE LIGHT INDICATOR

CROSS REFERENCED TO RELATED APPLICATION

The present application is a continuation-in-part of Applicant's co-pending application entitled: "REMOTE OUTPUT INDICATOR FOR PROVIDING OUTPUT INDICATIONS FROM A REMOTELY LOCATED RADAR DETECTOR", Ser. No. 002424, Filed Jan. 12, 1987.

BACKGROUND OF THE INVENTION

Field of the Invention

The present invention relates generally to a means for providing output indications of a radar detector at a location remotely located from the radar detector, and, more particular, but not by way of limitation, the present invention relates to a remote output indicator for providing output indications of a radar detector at a console remotely located from the radar detector so the radar detector can be mounted on an automobile within a protected space defined by a rear brake light indicator housing to substantially prevent theft of the radar detector.

DESCRIPTION OF THE PREFERRED EMBODIMENTS

In Applicant's co-pending application entitled: "REMOTE OUTPUT INDICATOR FOR PROVIDING OUTPUT INDICATIONS FROM A REMOTELY LOCATED RADAR DETECTOR", Ser. No. 002424, Filed Jan. 12, 1987, referred to before, Applicant described and claimed a remote output indicator for providing output indications from a remotely located radar detector, which included a remote unit and a console, and the disclosure of this co-pending application hereby specifically is incorporated herein by reference.

Figure 1:
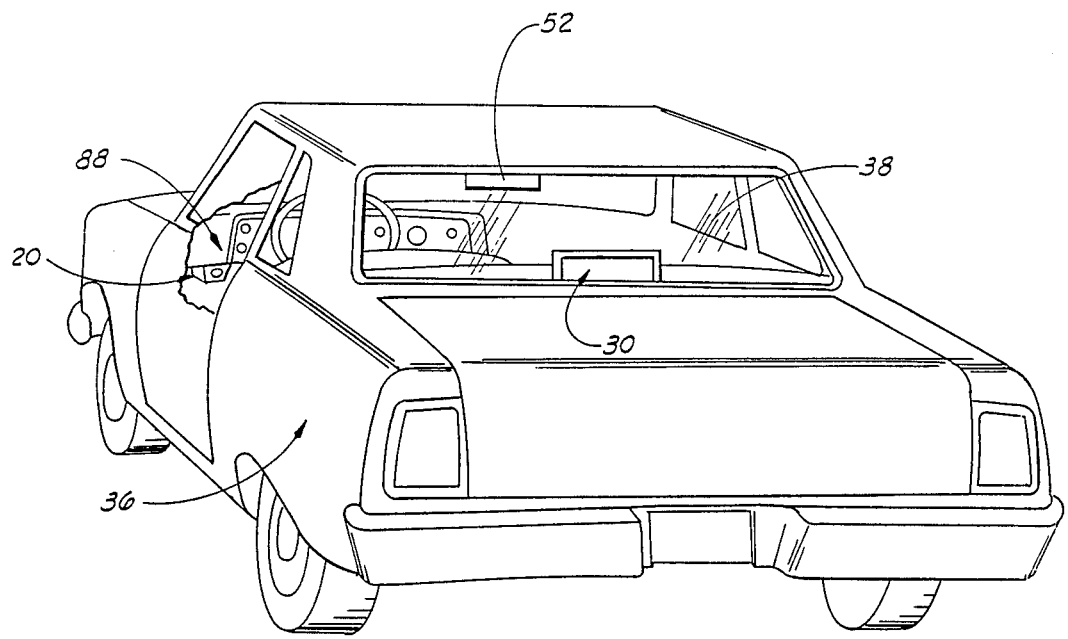
FIG. 1 is a diagrammatic view showing the remote unit and the radar detector mounted within a protected space (within the rear brake light indicator housing) of an automobile and showing the console unit mounted within a driver perceivable location within the automobile, the console being also mounted within the rear brake light indicator housing in one embodiment and the console being mounted on the dashboard in another embodiment and the remote unit and the console comprising the remote output indicator.
Figure 2:
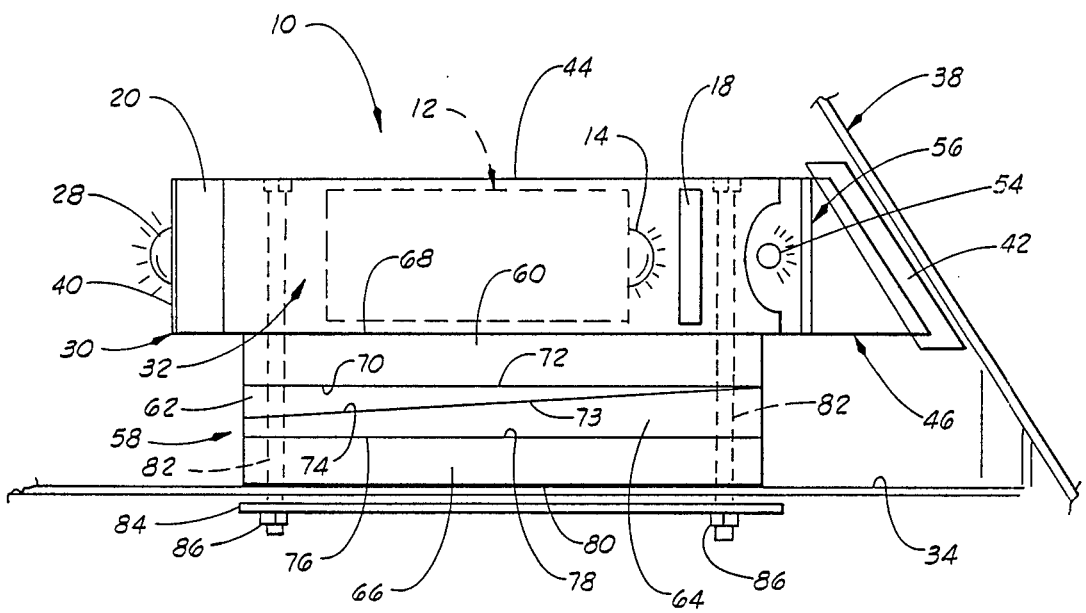
FIG. 2 is a diagrammatic, partial sectional view showing the remote output indicator and the radar detector mounted within a protected space (within the rear brake light indicator housing) of an automobile, only portions of the automobile being shown in FIG. 2.

The present invention shown in FIGS. 1 and 2 also comprises a remote output indicator 10 which is constructed and adapted to be used in connection with an existing, commercially available radar detector 12, the radar detector 12 being shown in dash-lines in the drawings.

The radar detector 12 is adapted to sense or detect signals outputted by an operating radar when the radar detector 12 is within a predetermined proximity of the operating radar. The radar detector 12 detects the signals outputted by the operating radar and provides an output indication in response to receiving or detecting such signals thereby providing an output indication indicating that the radar detector 12 is within the predetermined proximity of an operating radar. More particularly, the radar detector 12 includes a lamp 14 (shown in FIGS. 2 and 3) for providing a radar detector visibly perceivable output indication in response to detecting signals from an operating radar and the radar detector 12 also includes a speaker 16 (shown in FIG. 3) for providing a radar detector audibly perceivable output indication in response to detecting signals from an operating radar. The radar detector 2 also may include a meter type output indicator (not shown in the drawings) for providing a visually perceivable output indication in the manner described in detail in Applicant's co-pending application referred to before. Radar detectors which are constructed and operate in the manner described before with respect to the radar detector 12 are commercially available from various sources such as Cincinnati Microwave's Escort, for example and thus a detail description of the construction and operation of such a radar detector is not deemed necessary herein. Further, radars for detecting the speed of automobiles are common and well known in a detailed description of the construction and operation of such radars is not deemed necessary herein.

Figure 3:
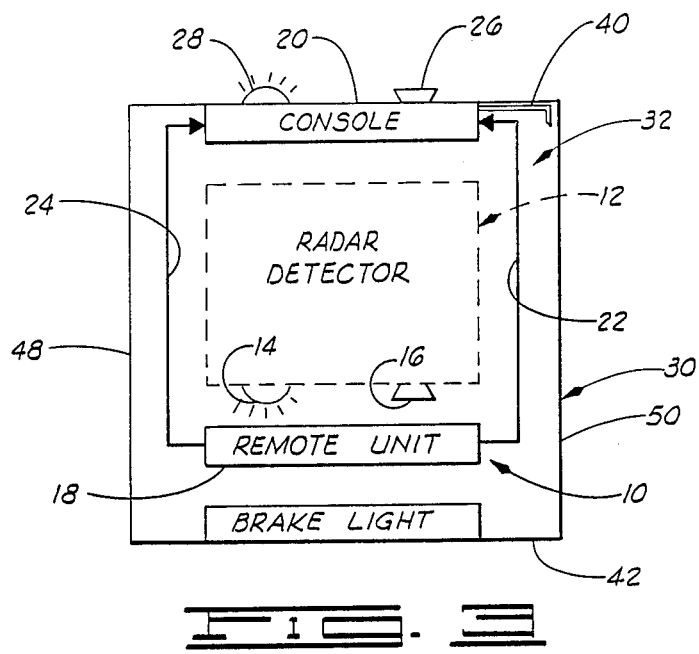
FIG. 3 is a schematic, diagrammatic view of the remote output indicator mounted within the rear brake light indicator housing shown in FIGS. 1 and 2.

The remote output indicator 10 of the present invention consists of a remote unit 18 (shown in FIG. 2 and 3) and a console 20 (shown in FIGS. 1, 2 and 3). The remote unit 18 is located near the radar detector 12 and includes one portion for sensing the radar detector audibly perceivable output indication for provided by the speaker 16 and another portion for sensing the radar detector visually perceivable output indication provided by the lamp 14. When the remote unit 18 senses an audibly perceivable output indication outputted by the radar detector 12, the remote unit 18 outputs a signal on a signal path 22 (shown in FIG. 3) in response to and indicative of the radar detector 12 audibly perceivable output indication. When the remote unit 18 senses or detects visually perceivable output indication outputted by the radar detector 12, the remote unit 18 outputs a signal on a signal path 24 (shown in FIG. 3) in response to and indicative of the radar detector 12 visually perceivable output indication.

The console 20 is remotely located from the radar detector 12 and the remote unit 18, and the console 22 is adapted to receive the signals outputted by the remote unit 18 on the signal paths 22 and 24. In response to receiving a signal outputted by the remote unit 18 on the signal path 22, the console outputs an audibly perceivable output indication by way of a speaker 26 (shown in FIG. 3) thereby providing or outputting an audibly perceivable output indication indicating that the radar detector 12 has outputted an audibly perceivable output indication. In response to receiving a signal on the signal path 24 outputted by the remote unit 18, the console 20 outputs a visually perceivable output indication by way of a lamp 28 thereby providing a visually perceivable output indication indicating that the radar detector 12 is outputted a visually perceivable output indication.

As shown in FIGS. 1, 2 and 3, the system of the present invention includes a rear brake light indicator housing 30 having a housing space 32 formed therein. The housing space 32 is shaped and adapted so that the radar detector 12, the remote unit 18 and the console 22 each are disposed within the housing space 32 of the rear brake light indicator housing 30 in one embodiment as shown more clearly in FIGS. 2 and 3. The rear brake indicator light housing 30 is secured to a rear deck 34 portion of an automobile 36 by way of a plurality of bolts which extend through the rear brake light indicator housing 30 and into the rear deck 34 of the automobile 36 thereby securing the rear brake light indicator housing 30 to the rear deck 34, generally near a rear window 38 of the automobile 36.

As shown in FIG. 1, the rear brake light indicator housing 30 includes the radar detector 12, the remote unit 18 and the console 20 for illustrating the use of the present invention in the form shown in FIGS. 2 and 3 mounted in the automobile 36. Also, shown in FIG. 1 is the console 20 mounted on the automobile dashboard for illustrating the use of the present invention mounted in an automobile in the embodiment shown in FIG. 4. In practice, the present invention can include one console 20 mounted in either the rear brake light indicator housing 30 or mounted on the dashboard or two consoles 20 could be utilized, one mounted in the rear brake light indicator housing 30 and one mounted on the dashboard if desired. In either case, it is desirable to mount the on-off switch (not shown in the drawings) near the driver.

As shown more clearly in FIGS. 2 and 3, the rear brake light indicator housing 30 includes a forward end 40, a rearward end 42, an upper surface 44, a lower surface 46 and opposite sides 48 and 50. The foreward and rearward ends 40 and 42, the upper and lower surfaces 44 and 46 and the opposite sides 48 and 50 are interconnected to form a generally rectangularly shaped rear brake light indicator housing 30, and the forward and rearward ends 40 and 42, the upper and lower surfaces 44 and 46 and the opposite sides 48 and 50 cooperate to substantially enclose the housing space 32.

The rear brake light indicator housing 30 is mounted on the rear deck 34 and oriented so that the rearward end 42 of the rear brake light indicator housing 30 generally faces the rearward end of the automobile 36 and so the forward end 40 of the rear brake light indicator housing 30 is perceivable by the operator of the automobile 36 by way of an automobile rearview mirror 52 (shown in FIG. 1), the forward end 40 of the rear brake light indicator housing 30 being oriented and disposed in a driver perceivable location. The rear brake light indicator housing 30 is mounted on the rear deck 34 and oriented so the rearward end 42 of the rear brake light indicator housing 30 is disposed generally near the rear window 38 of the automobile 36.

A rear brake light 54 (shown in FIG. 2) is mounted in the brake light indicator housing 30 and disposed generally near the rearward end 42 of the rear brake light indicator housing 30. A red brake lens 56 (shown in FIG. 2) extends across the rearward end 42 of the rear brake light indicator housing 30 and the rear brake light 54 is disposed on one side of the rear brake lens 56, generally opposite the side of the rear brake lens 56 which is disposed near the rear window 38.

The rear brake light 54 is oriented with respect to the rear window 38 and is connected to the automobile 36 so that the rear brake light 54 illuminates, when the driver of the automobile 36 depresses the brake pedal (not shown in the drawings). The rear brake light 54 is illuminated and so that the illuminated rear brake light 54 is perceivable through the rear window 38 by drivers of other automobiles following the automobile 36. Rear brake lights and the operation of such rear brake lights to function in the manner described before with respect to the rear brake light 54 are well known in the art and a detailed description is not deemed necessary herein. However, one rear brake light suitable for use in the present invention is described in detail in U.S. Pat. No. 4,575,782, issued to Levine, et al., Mar. 11, 1986, and the description contained in this patent hereby is specifically incorporated herein by reference.

As shown in FIG. 2, the present invention also includes a mounting assembly 58 for mounting the rear brake light indicator housing 30 to the rear deck 34 of the automobile 36. The mounting assembly 58 includes a plurality of mounting rings 60, 62, 64 and 66. Each of the mounting rings 60, 62, 64 and 66 may be circularly shaped, although the mounting rings 60, 62, 64 and 66 also may be square or rectangularly shaped in plan view. Mounting ring 60 has an upper surface 68 and a lower surface 70 and the upper surface 68 extends in a plane which is substantially parallel with the planer disposition of the lower surface 70. The mounting ring 62 has an upper surface 72 and a lower surface 73 and the lower surface 73 extends in a plane which is angular with respect to the planer disposition of the upper surface 72. The mounting 64 includes an upper surface 74 and a lower surface 76 and the upper surface 74 extends in a plane which is angular to the planer disposition to the lower surface 76. The mounting ring 66 has an upper surface 78 and a lower surface 80 and the lower surface 80 extends in a plane which is substantially parallel with the planer disposition of the upper surface 78.

The mounting rings 60, 62, 64 and 66 are stackable, one on top of the other, so that the two mounting rings 62 and 64 are disposed generally between the mounting rings 60 and 66. The mounting rings 60, 62, 64 and 66 are disposed so that the upper surface 68 of the mounting ring 60 is disposed generally adjacent the lower surface 46 of the rear brake light indicator housing 30 and the lower surface 70 of the mounting ring 60 is disposed generally adjacent the upper surface 72 of the mounting ring 62. The mounting ring 62 is oriented so that the upper surface 72 of the mounting ring 62 is disposed generally adjacent the lower surface 70 of the mounting ring 60 and the angular lower surface 73 of the mounting ring 62 is disposed generally adjacent the angular upper surface 74 of the mounting ring 64. The mounting ring 64 is oriented so that the angular upper surface 74 of the mounting ring 64 is disposed generally adjacent the angular lower surface 73 of the mounting ring 62 and the lower surface 76 of the mounting ring 64 is disposed generally adjacent the upper surface 78 of the mounting ring 66. The mounting ring 66 is disposed and oriented so that the upper surface 78 of the mounting ring 66 is disposed generally adjacent the lower surface 76 of the mounting ring 64 and the lower surface 80 of the mounting ring 66 is disposed generally adjacent the rear deck 34 of the automobile 36. In this position, mounting bolts 82 (two mounting bolts 82 being shown in FIG. 2) extend through openings (not shown in the drawings) in the rear brake light indicator housing 30 and through openings (not shown in the drawings) in the mounting rings 60, 62, 64 and 66 and through openings (not shown in the drawings) formed in the rear deck 34 of the automobile 36. A back-up plate 84 is disposed generally adjacent the rear deck 34 and disposed on the opposite side of the rear deck 34 with respect to the disposition of the rear brake light indicator housing 30 and the mounting rings 60, 62, 64 and 66. The mounting bolts 82 also extend through openings (not shown in the drawings) in the back-up plate 84.

In this position of the mounting bolts 82, the mounting bolts 82 are secured to the rear deck 34 by way of nuts 86, the mounting bolts 82 thereby securing the rear brake light indicator housing 30 to the rear deck 34 with the mounting rings 60, 62, 64 and 66 disposed generally between the rear brake light indicator housing 30 and the rear deck 34 (the mounting bolts 82 also secure the back-up plate 84 to the rear deck 34). The back-up plate 84 is constructed of metal and provides an additional strength to secure the rear brake light indicator housing 30 to the rear deck 34 for increasing the security of the mounting so that the rear brake light indicator housing 30 cannot be easily removed from the rear deck 34. The stackable mounting rings 60, 62, 64 and 66 can be rearranged so that the mounting ring 64 is disposed generally adjacent the mounting ring 60 and the mounting ring 62 is disposed generally adjacent the mounting ring 64 for varying the angular disposition of the rear brake light indicator housing 30 due to the angular disposition of the lower surface 70 of the mounting ring 62 and the angular disposition of the upper surface 72 of the mounting ring 62, which may be desireable in some applications to accommodate for angular dispositions of the rear window 38 of the automobile 36.

With the rear brake light indicator housing 30 secured to the rear deck 34 by way of the mounting assembly 58 in the manner described before, the housing space 32 within the brake light indicator housing 30 constitutes a protected space within the automobile 36 which has limited unauthorized access and, since the radar detector 12, the remote unit 18 and the console 20 each are disposed within the housing space 32, the radar detector 12 and the remote unit 18 and console 20 each are mounted within the protected space defined by the housing space 32 thereby substantially preventing unauthorized access to the radar detector 12, the remote unit 18 and the console 20. The console 20 also is mounted in the driver perceivable location by way of the orientation of the rear brake light indicator housing 30 and the rearview mirror 52, as described before.

In the past, it has been common to mount radar units on or under the dash of an automobile so that the visually perceivable and audibly perceivable and output indications of the radar detector can be perceived by the operator of the automobile. Also, in the past, it has been common for individuals to steal radar detectors mounted in this manner. The present invention provides a means for mounting radar detectors in a manner so that the radar detector substantially is protected from theft. Thus, in accordance with the present invention, the radar detector 12, the remote unit 18 and the console 20 (in the embodiment shown in FIGS. 2 and 3) are mounted or connected to the automobile and located within the protected space within the automobile, that is, within in the housing space 32, thereby substantially preventing theft of the radar detector 12 or the remote 18 or the console 20.

Figure 4:
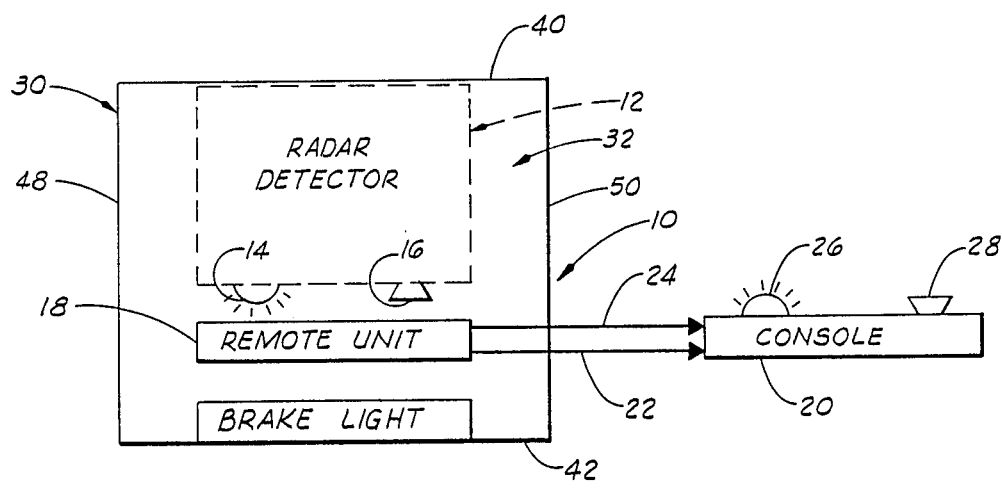
FIG. 4 is a diagrammatic, schematic view, similar to FIG. 3, but showing the remote unit and radar detector mounted within the rear brake light indicator housing and the console remotely located with respect to the rear brake light indicator housing.

In the alternative, as schematically shown in FIG. 4, the remote unit 18 can be mounted within the protected space defined by the housing space 32 and the console 20 can be located on or near a dashboard 88 of the automobile (shown in FIG. 1). In this manner, the radar detector 12 and the remote unit 18 still are mounted within the protected space defined by the housing space 32 of the rear brake light indicator housing 30 and only the console 20 is disposed in the driver perceivable location defined as being on or near a dashboard 88. In this embodiment, the console 20 still is mounted within an area which is subject to theft of the console 20; however, the console 20 is substantially less expensive as compared to the cost of the radar detector 12 and the console 20 has virtually no use without the remote unit 18 and the radar detector 12 which are located within the protected space defined by the housing space 32 of the rear brake light indicator housing 30, thereby substantially reducing the theft of the console 20.

The details of the construction of the remote unit 18 and the console 20 are described in detail in Applicant's co-pending application referred to above and incorporated herein specifically by reference. Thus, the details of the construction of the remote unit 18 and console 20 will not specifically be repeated herein since such details are specifically are incorporated by reference.

Figure 5:
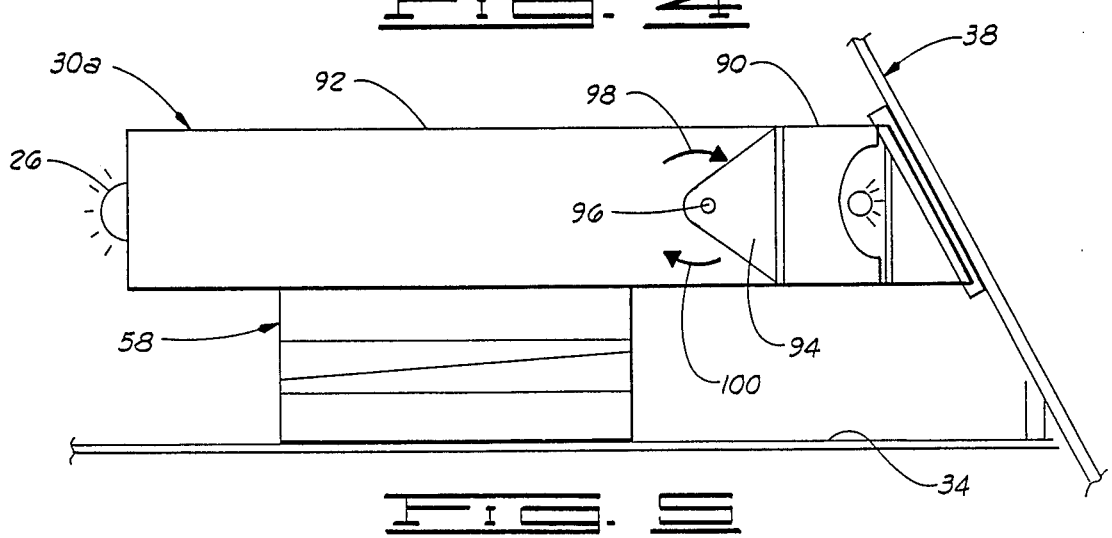
FIG. 5 is a view similar to FIG. 2, but showing a modified rear brake light indicator housing adapted to compensate for rear window angle.

Shown in FIG. 5 is a modified brake light indicator housing 30a which is constructed exactly like the rear brake light indicator housing 30 described before, except the rear brake light indicator housing 30a includes a first housing portion 90 and a second housing portion 92 which are connected together by way of a flange 94 connected to the first housing portion 90. The flange 94 is pinned to the second housing 92 by way of a pin 96 so that the first housing portion 90 can be rotated in directions 98 and 100 with respect to the second housing portion 92. In this embodiment, the second housing portion 92 is secured to the rear deck 34 in the manner described before and the first housing portion 90 is rotatable in the directions 98 and 100 with respect to the second housing portion 92 for varying the angular disposition of the first housing portion 90 to adjust for the angle of the rear window 38.

It should be noted that the rear brake light indicator housing 30a shown in FIG. 5 also includes a second flange (not shown in the drawings) exactly like the flange 94 but disposed on the opposite side of the first and the second housing portions 90 and 92 for cooperating with the flange 94 to pivotally connect the two housing portions 90 and 92. In addition, it should be noted that the first and second housing portions 90 and 92 each include a housing space (not shown) and the housing space in the housing portions 90 and 92 cooperate to form the housing space in the rear brake light indicator housing 30a.

Since the radar detector 12, remote unit 18 and the console 20 are all located within the housing space 32 of the rear brake light indicator housing 30 in the embodiment of the present invention shown in FIGS. 2 and 3, the sound levels emitted from the radar detector 12 may be sufficiently high that no amplification is required from the remote unit 18 for transferring such sound to the console 20. Further, in the embodiments of the invention disclosed herein, the function of the console 20 may be divided or duplicated in locations in the rear brake light indicator housing 30 or at other driver perceivable locations. In other words, the sound or light could come from either the console 20 or the remote unit 18 or both. With respect to the analog output indicator (not shown in these drawings but disclosed in the co-pending application referred to before), this output indication would be more functional if it were located near the automobile dashboard. Also, it should be noted that fiber optics could be utilized to transmit the light indication from the radar detector 12 to the console 20 for providing the visually perceivable output indication.

In an alternate embodiment, the output signal provided by the remote unit 18 on the signal path 24 is connected to the automobile cruise control for automatically disengaging the cruise control. Thus, the visually perceivable output indication provided by the radar detector 12 will instantaneously disengage the cruise control, thereby initiating a slow down of the automobile speed, by passing the driver's normal reaction time delay.

Changes may be made in the construction and operation of the various parts, elements and assembly described herein and changes may be made in the steps or the sequence of steps of the method described herein without departing from the spirit and the scope of the invention as defined in the following claims.

What is claimed is:

1. A remote output indicator for use with a radar detector providing a perceivable output indication to detect signals from an operating radar mountable within an automobile having a rear window and a rear deck disposed near the rear window comprising:
    a rear brake light indicator housing encompassing a housing space and a rear brake light disposed within the housing space, the radar detector being mountable within the housing space;
    a mounting assembly for connecting the rear brake light indicator housing to the automobile generally near the rear window;
    a remote unit disposed within the rear brake light indicator housing having one portion for sensing the radar detector perceivable output indication and providing an output signal indicative of the radar detector perceivable output indication; and
    a console receiving the output signal from the remote unit indicative of the radar detector perceivable output indication and providing a perceivable output indication in response to receiving the output signal indicative of the radar perceivable output indication from the remote unit, the console being located in a driver perceivable location so that the output indication provided by the console unit is perceivable by the driver of the automobile.

2. The remote output indicator of claim 1 wherein the console is defined further as being disposed within the housing space of the rear brake light indicator housing.

3. The remote output indicator of claim 1 wherein the mounting assembly is defined further as connecting the rear brake light indicator housing to the rear deck of the automobile.

4. The remote output indicator of claim 1 wherein the radar detector is defined further has having a speaker and wherein the perceivable output indication provided by the radar detector is defined further as being a radar detector audibly perceivable output indication provided by the speaker of the radar detector in response to detecting signals from an operating radar, and wherein the remote unit is defined further as having one portion for sensing the radar detector audibly perceivable output indication and providing the output signal in response to and indicative of the radar detector audibly perceivable output indication, and wherein the console is defined further as receiving the output signal indicative of the radar detector audibly perceivable output indication from the remote unit and wherein the output indication provided by the console is defined further as being an audibly perceivable output indication provided in response to receiving the output signal from the remote unit indicative of the radar detector audibly perceivable output indication.

5. The remote output indicator of claim 1 wherein the radar detector is defined further as having a lamp and wherein the output indication provided by the radar detector is defined further as being a radar detector visually perceivable output indication provided by the lamp in response to detecting signals from an operating radar, and wherein the remote unit is defined further as having one portion for sensing the radar detector visually perceivable output indication and providing the output signal in response to and indicative of the radar detector visually perceivable output indication, and wherein the console is defined further as receiving the remote unit output signal indicative of the radar detector visually perceivable output indication and wherein the output indication provided by the console is defined further as being a visually perceivably output indication provided in response to and indicative of the output signal received from the remote unit indicative of the radar detector visually perceivable output indication.

6. The remote output indicator of claim 1 wherein the rear brake light indicator housing is defined further as including a forward end and a rearward end, an upper and a lower surface, and opposite sides, and wherein the rear brake light is defined further as being disposed in the rear brake light indicator housing generally near the rearward end of the rear brake light indicator housing and wherein the rear brake light indicator housing is defined further as being mounted on the automobile so that the rearward end of the rear brake light indicator housing is disposed generally near the rear window, and wherein the rear brake light indicator housing is defined further as having means for adjusting the rear brake light housing to adjust for angular dispositions of the rear window.

7. The rear brake light indicator of claim 6 wherein the rear brake light indicator housing is defined further as including:
    a first housing portion;
    a second housing portion, the first and the second housing portions each having a housing space formed therein and the housing spaces in the first and the second housing portions cooperating to form the housing space in the rear brake light indicator housing, the first housing portion being pivotally connected to the second housing portion for adjusting the angular disposition of the first housing portion.

8. The remote output indicator of claim 1 wherein the rear brake light housing is defined further to include forward and rearward ends, upper and lower surfaces, and opposite sides, and wherein the mounting means is defined further to include an adjustable portion for adjusting the angular disposition of the rear brake light indicator housing.

9. The remote output indicator of claim 1 wherein the automobile includes a dashboard and wherein the console is defined further as being mountable near the dashboard in a driver perceivable location.

10. The remote output indicator of claim 1 wherein the automobile includes a cruise control and wherein the remote unit is defined further as providing the output signal indicative of the radar detector perceivable output indication to the cruise control for automatically disengaging the cruise control.

* * * * *